United States Patent
Chou et al.

(10) Patent No.: US 7,050,792 B2
(45) Date of Patent: May 23, 2006

(54) VOICE MESSAGE NOTIFICATION AND RETRIEVAL VIA MOBILE CLIENT DEVICES IN A COMMUNICATION SYSTEM

(75) Inventors: Wu Chou, Basking Ridge, NJ (US); Feng Liu, Raritan, NJ (US); Stephen M. Milton, Freehold, NJ (US); Doree Duncan Seligmann, New York, NY (US); Xueshan Shan, Orefield, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 244 days.

(21) Appl. No.: 10/668,563

(22) Filed: Sep. 23, 2003

(65) Prior Publication Data

US 2004/0121762 A1 Jun. 24, 2004

Related U.S. Application Data

(60) Provisional application No. 60/435,463, filed on Dec. 20, 2002.

(51) Int. Cl.
*H04M 1/663* (2006.01)

(52) U.S. Cl. .............................. 455/412.2; 455/412.1; 455/413; 709/217; 709/219

(58) Field of Classification Search ............. 455/412.1, 455/412.2, 413; 709/217, 219

See application file for complete search history.

(56) References Cited

U.S. PATENT DOCUMENTS

| | | | | |
|---|---|---|---|---|
| 5,905,776 A | * | 5/1999 | Shaffer | 379/88.22 |
| 6,307,931 B1 | * | 10/2001 | Vaudreuil | 379/229 |
| 6,738,808 B1 | * | 5/2004 | Zellner et al. | 709/223 |
| 6,751,298 B1 | * | 6/2004 | Bhogal et al. | 379/88.13 |
| 6,842,622 B1 | * | 1/2005 | Peters et al. | 455/458 |
| 2004/0088715 A1 | * | 5/2004 | Korall et al. | 719/318 |
| 2004/0203940 A1 | * | 10/2004 | Urs | 455/466 |

OTHER PUBLICATIONS

J.J. Li et al., "An Adaptable Architecture for Secure Delivery of Converged Serives," The 6th International Symposium on Autonomous Decentralized Systems, pp. 1-5, Apr. 2003.

(Continued)

*Primary Examiner*—Sonny Trinh
*Assistant Examiner*—Fred A. Casca
(74) *Attorney, Agent, or Firm*—Ryan, Mason & Lewis, LLP

(57) ABSTRACT

Voice message notification and retrieval functionality is provided for a mobile client device in a communication system by generating push content deliverable from a server to the mobile client device over a wireless network. The push content comprises a notification of at least one voice message received for a corresponding user in a voice messaging system. A connection between the mobile client device and the voice messaging system may be initiated from the mobile client device, responsive to the push content, for retrieval of the at least one received voice message. For example, the push content may comprise at least one link which when activated at the mobile client device initiates a connection between the mobile client device and the voice messaging system.

20 Claims, 1 Drawing Sheet

OTHER PUBLICATIONS

F. Liu et al., "A Distributed Multimodal Dialogue System Based on Dialogue System and Web Convergence," Proc. ICSLP'02, 4 pages, Oct. 2002.

X. Shan et al., "A Case Study of IP Network Monitoring Using Wireless Mobile Devices," Proc. IC3N'01, 4 pages, Oct. 2001.

G. Niklfeld et al., "Architecture for Adaptive Multimodal Dialog Systems Based on VoiceXML," Proceedings of Eurospeech, 4 pages, 2001, no month listed.

K. Wang, "Implementation of a Multimodal Dialogue System Using Extended Markup Languages," Proc. of the Int. Conf. on Spoken Language Processing, 4 pages, Oct. 2000.

J. Hjelm et al., Index of Submissions, W3C Workshop on Delivery Context, http://www.w3.org/2002/02/DIWS/submission/, 8 pages, Mar. 2002.

WAP Architecture, Version 12, Wireless Application Protocol, Architecture Specification, WAP-210-WAPArch-20010712, http://www1.wapforum.org/tech/documents, Jul. 2001.

WAP Push Architectural Overview, Version 3, Wireless Application Protocol, WAP-250-PushArchOverview-20010703-a, http://www1.wapforum.org/tech/documents, Jul. 2001.

WAP Push Access Protocol, Version 16, Wireless Application Protocol, Push Access Protocol Specification, http://www.wapforum.org/technical/PROP-PAP-19990816.pdf, Aug. 1999.

WAP Push OTA Protocol, Version 25, Wireless Application Protocol, WAP-235-PushOTA-20010425-a, http://www1.wapforum.org/tech/documents/WAP-235-PushOTA-20010425-a.pdf, Apr. 2001.

Mobilis General Description, www.activevoice.nl/press/mobilis, pp. 1-26, Mar. 2002.

* cited by examiner

VOICE MESSAGE NOTIFICATION AND RETRIEVAL VIA MOBILE CLIENT DEVICES IN A COMMUNICATION SYSTEM

RELATED APPLICATION(S)

The present application claims the priority of U.S. Provisional Patent Application Ser. No. 60/435,463, filed Dec. 20, 2002 and entitled "System and Architecture of Multimodal and Multimedia Access for Secure Service Delivery, Service Notification and Monitoring Over Converged Networks for Mobile Users," the disclosure of which is hereby incorporated by reference herein.

The present application is related to U.S. patent application Ser. No. 10/668,577, filed concurrently herewith and entitled "Secure Interaction Between a Mobile Client Device and an Enterprise Application in a Communication System," the disclosure of which is hereby incorporated by reference herein.

FIELD OF THE INVENTION

The invention relates generally to the field of communication systems, and more particularly to techniques for controlling access of mobile users to an enterprise voice messaging system (VMS).

BACKGROUND OF THE INVENTION

In recent years there has been extensive growth in VMS use in corporations and other enterprises. It is generally desirable to provide secure remote access to an enterprise VMS, in order to accommodate those users who may be traveling, telecommuting or otherwise in a location remote from the enterprise itself. For example, such users will generally want to be able to access the enterprise VMS from a mobile client device, such as a mobile telephone or personal digital assistant (PDA).

One type of conventional approach to providing the above-noted remote access does not supply received message notifications to remote users. Instead, a user must frequently call in to access his or her voice mailbox on the enterprise VMS in order to determine if any messages have been received. Clearly, such an approach is inconvenient for the user.

There are also a number of notification-enabled approaches. For example, a user may be notified via an e-mail message or a short message service (SMS) message when a new voice message arrives for that user in the VMS. However, with this approach the user generally still has to dial the telephone number of the enterprise VMS in order to access the received voice message. This can be very cumbersome, particularly when the remote user is in transit and equipped with only a simple mobile device having a small keypad. Other notification-enabled approaches are more sophisticated, and upon notification may allow the user to access the VMS via a web page or other type of direct connection. However, these more sophisticated arrangements often require special purpose hardware, such as a complex telephony server or a special type of mobile device, and are generally not designed for single-key access to the VMS from the mobile device.

It is apparent from the foregoing that a need exists for improved techniques for voice message notification and retrieval for mobile users.

SUMMARY OF THE INVENTION

The present invention meets the above-noted need by providing, in accordance with one aspect of the invention, improved voice message notification and retrieval for a mobile client device in a communication system. More specifically, voice message notification and retrieval functionality is provided by generating push content deliverable from a server to the mobile client device over a wireless network. The push content comprises a notification of at least one voice message received for a corresponding user in a VMS. A connection between the mobile client device and the voice messaging system is initiatable from the mobile client device, responsive to the push content, for retrieval of the at least one received voice message.

In an illustrative embodiment, the push content comprises at least one link which when activated at the mobile client device initiates a connection between the mobile client device and the VMS. As a more particular example, the at least one link may comprise a live telephone link specifying at least a telephone number of the VMS, such that the connection between the mobile client device and the voice messaging system may be initiated from the mobile client device utilizing a single-key operation.

The server in the illustrative embodiment comprises a wireless secure server (WSS) that is coupled to an enterprise multimedia communication server (EMCS). The WSS communicates with the mobile client device utilizing wireless application protocol (WAP). The VMS may be coupled between the EMCS and a private branch exchange (PBX) element of the communication system. The VMS upon receipt of the voice message generates an outgoing call to the PBX element, with the outgoing call comprising routing information and user identification information, and the user identification information identifying the user corresponding to the received voice message. The outgoing call is processed in the PBX element in a manner that results in a connection being established between the VMS and the EMCS, with the user identification information thereby being made accessible to the EMCS. The EMCS operates in conjunction with the WSS in generating the push content that is deliverable to the mobile client device.

The push content may be deliverable from the WSS to the mobile client device via a series connection of a push initiator and a push proxy gateway. For example, the push content may be generated in the form of a service indication (SI) including at least one notification message and at least one corresponding link which when activated provides access to the received voice message at the mobile client device.

In accordance with another aspect of the invention, the push content may provide a notification of each of a plurality of received voice messages. For example, at least one of the plurality of received voice messages may be associated with a first voice mailbox of the VMS and one or more of the remaining received voice messages may be associated with one or more other voice mailboxes of the VMS. As another example, at least one of the plurality of received voice messages may be associated with a first VMS and one or more of the remaining received voice messages may be associated with a second VMS different than the first VMS.

The present invention provides numerous advantages over the conventional techniques previously described. For example, as noted above, the invention in the illustrative embodiment supports single-key operation for access to a VMS to retrieve a stored voice message, thereby avoiding the need for users to enter VMS telephone numbers at their mobile client devices. Also, the invention can be used to provide automated notification and retrieval for multiple mailboxes across different VMS providers, making it appear to the user as if all of the multiple mailboxes were associated with a single provider. In addition, the voice message notification and retrieval is provided in a secure manner, without compromising the EMCS, VMS or other elements behind a system firewall. Moreover, the illustrative embodiment leverages existing VMS, PBX and other telephony equipment elements of the system, such that the improved voice message notification and retrieval is provided in a particularly efficient manner and at low cost.

DETAILED DESCRIPTION OF THE INVENTION

The invention will be described below in conjunction with an exemplary communication system. It should be understood, however, that the invention is not limited to use with any particular type of communication system or any particular configuration of clients, servers, gateways or other processing elements of the system. Those skilled in the art will recognize that the disclosed techniques may be used in any communication system application in which it is desirable to provide improved remote access to an enterprise VMS from a mobile client device.

Figure 1:
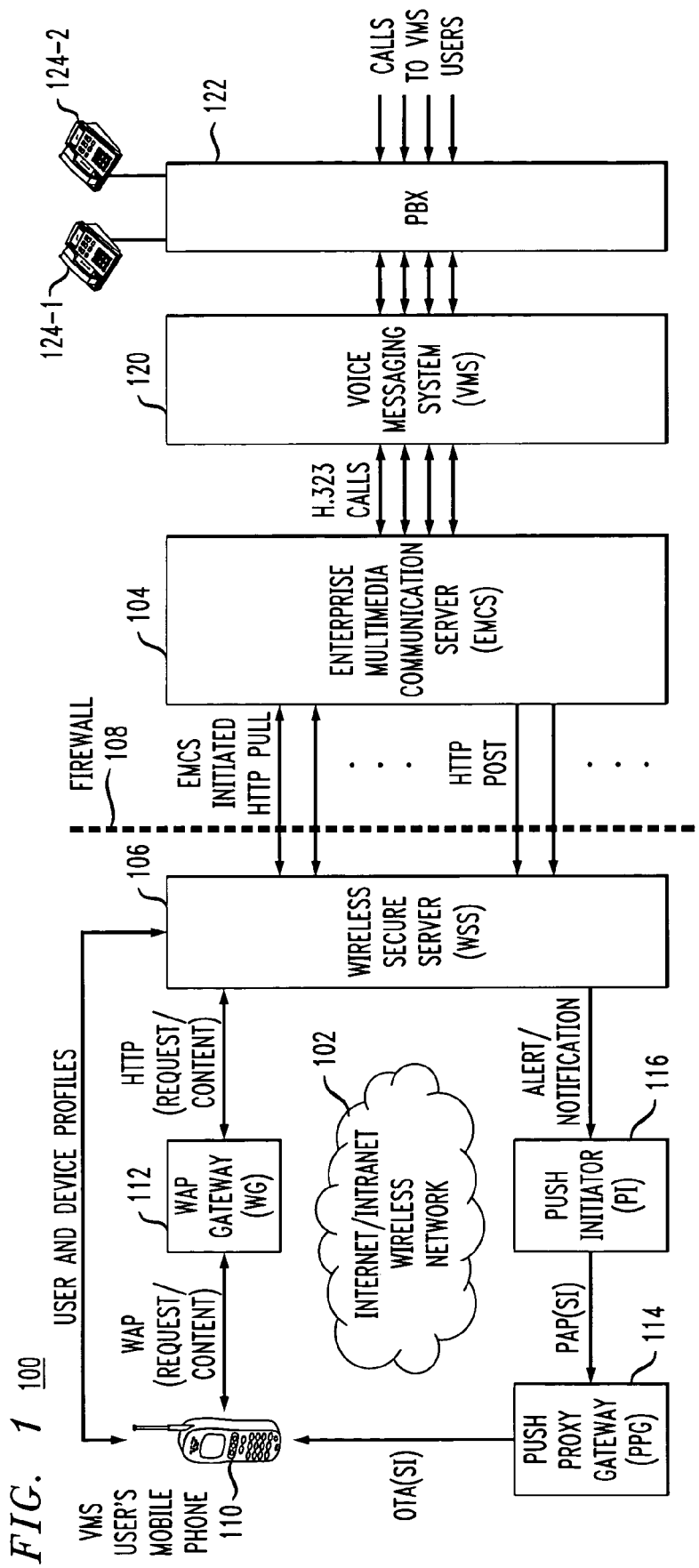
FIG. 1 shows an exemplary communication system in which the invention is implemented.

FIG. 1 shows an example communication system 100 in which the present invention is implemented. The system 100 includes a network 102, an enterprise multimedia communication server (EMCS) 104, and a wireless secure server (WSS) 106. The EMCS 104, which is assumed to run on a computer, server or other processing element associated with a given enterprise, is separated from the WSS 106 via an enterprise firewall 108.

The system 100 also includes a wireless application protocol (WAP) mobile client device 110, which communicates with the WSS 106 over network 102. More specifically, the mobile client device 110 communicates with the WSS 106 via WAP gateway (WG) 112, and via a push proxy gateway (PPG) 114 and a push initiator (PI) 116, as shown.

The system 100 further includes a VMS 120 coupled to the EMCS 104. The VMS 120 is coupled to a private branch exchange (PBX) 122 which supports a number of user terminals denoted generally by 124-1 and 124-2. The VMS 120 in this embodiment exchanges voice messaging information, illustratively in the form of H.323 calls, with the EMCS 104, based on calls placed to VMS users and received in the PBX 122.

The details of WAP are well known to those skilled in the art, and are described in the WAP specification documents, which are hereby incorporated by reference herein. These documents include the following:

WAP Architecture: http://www1.wapforum.org/tech/documents/WAP-210-WAPArch-20010712-a.pdf;

WAP Push Architecture: http://www1.wapforum.org/tech/documents/WAP-250-PushArchOverview-20010703-a.pdf;

PAP: http://www.wapforum.org/what/technical/PROP-PAP-19990816.pdf; and

OTA: http://www1.wapforum.org/tech/documents/WAP-235-PushOTA-20010425-a.pdf.

Although WAP is utilized in the illustrative embodiment, it should be understood that use of WAP is not a requirement of the invention. Examples of other protocols that may be used in implementing the invention include SMS, MMS, GPRS, IEEE 802.11, etc.

The EMCS 104 is an example of what is more generally referred to herein as an enterprise application, and it is to be appreciated that numerous other enterprise applications may be used in place of EMCS 104 in implementing the invention.

The EMCS 104 may comprise one or more software programs running on or otherwise associated with a communication system switch, such as a DEFINITY® Enterprise Communication Service (ECS) communication system switch available from Avaya Inc. of Basking Ridge, N.J., USA. Another example call processing switch suitable for use in conjunction with the present invention is the Multi-Vantage™ communication system switch, also available from Avaya Inc. Such switches may also be used to implement the VMS 120 and PBX 122 of FIG. 1, as will be apparent to those skilled in the art.

The WG 112, PPG 114 and PI 116 may each be implemented as one or more applications or other software programs running on a web server or any other type of processing platform suitable for executing such programs.

The WSS 106 communicates alert and/or notification information to the mobile client 110 via PI 116 and PPG 114, and receives requests from and delivers associated content to the mobile client 110 via the WG 112.

As is described in greater detail in the above-cited U.S. patent application Ser. No. 10/668,577, the WSS 106 may include elements such as a device profiling element, a registration server, a first-in first-out (FIFO) user and device profile queue, and a content generator including functionality associated with real-time embedded uniform resource identifier (URI) processing, content and control. Other elements, such as one or more connectors and an image rendering module, may also be included in the WSS. It is to be appreciated, however, that the invention does not require any particular grouping of elements within the WSS, and numerous configurations suitable for providing the WSS functionality described herein will be readily apparent to those skilled in the art.

In the illustrative embodiment, the WSS 106 preferably interacts with the EMCS 104 through hypertext transfer protocol (HTTP) or hypertext transfer protocol secure (HTTPS) connections, such as EMCS-initiated HTTP PULL and POST communications, and utilizes WAP to deliver multimedia service content to mobile client devices.

References to HTTP herein should be understood to include the possible use of HTTPS where appropriate. For example, HTTPS allows the use of secure sockets layer (SSL) as its transport protocol access scheme, as is well-known in the art, and this type of an arrangement may be utilized in a given embodiment of the invention.

It should be noted that, although shown as separate elements in the embodiment of FIG. 1, the EMCS 104 and WSS 106 in other embodiments may be elements of a single common processing platform. However, the EMCS and WSS when implemented on a common processing platform are still preferably logically separated such that the EMCS is behind the enterprise firewall and the WSS is outside the enterprise firewall, as shown in the figure.

The WSS 106 is an example of what is more generally referred to herein as a "server." The term "server" as used herein in the context of the WSS is intended to include any arrangement of one or more computers or other processing devices configurable to provide interaction between a mobile client device and an enterprise application using a combination of push and pull delivery mechanisms in accordance with the invention.

User and device profile information may be shared between the mobile client 110 and a device profiling element of the WSS 106, via a connection established over the network 102 or other suitable communication channel.

The mobile client device 110 is also referred to herein as a mobile client, or simply as a client. The mobile client 110, although illustrated in FIG. 1 as a mobile cellular telephone, may alternatively be a personal digital assistant (PDA), a mobile computer, or any other type of processor-based client device suitably configured for interaction with the WSS 106 in providing various communication functions of the system 100. Conventional aspects of such client devices are well known in the art and therefore not described in further detail herein. Also, although only a single mobile client is shown in the figure, the system 100 will typically include many such clients.

Additional system elements, of a type known in the art but not explicitly shown in FIG. 1, may be coupled between the mobile client 110 and the WSS 106, between the WSS 106 and the EMCS 104, or otherwise arranged within the system 100, in accordance with conventional practice.

Network 102 may represent, e.g., a global communication network such as the Internet, an intranet, a wide area network, a metropolitan area network, a local area network, a wireless cellular network, or a satellite network, as well as portions or combinations of these or other wired or wireless communication networks. The network 102 in the illustrative embodiment may thus be viewed as a converged network which includes a mobile wireless network portion and an Internet and/or intranet network portion.

It should be emphasized that the simplified configuration of the system 100 as shown in FIG. 1 is for purposes of illustration only, and should not be construed as limiting the invention to any particular arrangement of elements. For example, the system 100 may include additional clients, servers, gateways, routers, switches or other types of processing elements.

As indicated above, the illustrative embodiment includes a number of WAP-enabled processing elements. WAP generally provides an open, global specification for developing applications that operate over different wireless communication networks. Again, although the illustrative embodiment makes use of WAP and is described in that context, WAP is not a requirement of the invention, and the invention can be implemented using other standard or non-standard protocols.

One important aspect of WAP is the specification of a push architecture that allows content to be sent or "pushed" by server-based applications to a WAP-compliant mobile client device, without requiring an explicit request from the device. The term "push content" as used herein is intended to include any type of information that may be sent to a mobile client device via a push mechanism.

In the FIG. 1 embodiment, the PI 116 communicates with the PPG 114 using Push Access Protocol (PAP), while the PPG 114 uses a push Over-The-Air (OTA) protocol to deliver the push content to the mobile client. The PPG may notify the PI about the final outcome of a push submission and optionally handle cancellation, replacement, client capability or other requests from the PI.

The PI 116 and its interaction with other system elements will now be described in greater detail.

The PI 116 is an entity that originates push content and submits it in the form of a push request to the PPG 114 for delivery to the WAP mobile client 110. The push request is preferably configured in accordance with the above-noted PAP or other suitable protocol. The PI in the illustrative embodiment is typically on the Internet, while the WAP mobile client 110 is in the WAP domain. Therefore, the PI cannot contact the WAP mobile client without an intermediary or a translation gateway, provided in this embodiment by the PPG 114. The PI addresses the PPG directly and addresses the mobile client indirectly. It assembles the push request in PAP format and submits the corresponding PAP message to the PPG. Each such submission has a unique identifier. By way of example, the PI can request the outcome of a submission, e.g., submission delivered or submission undeliverable, check the capabilities of a specific client device, or check the status of a previous submission or cancellation of a submission. The PPG provides the PI with client capability lookup services, thereby allowing the PI to select the optimal presentation attributed for particular content and a given client.

PAP utilizes extensible mark-up language (XML) and may be transported using protocols such as HTTP, simple mail transfer protocol (SMTP), etc. An example push request in the illustrative embodiment may be implemented as a single-part or multi-part document which contains one or more of the following entities:

1. A control entity comprising an XML document containing delivery instructions designed for the PPG 114. The control entity is generally viewed as a mandatory entity in the illustrative embodiment. It identifies the target mobile client device and contains delivery instructions such as time delivery restrictions.

2. A content entity that contains content destined for the mobile client device. A content entity is only required for a push submission, but when utilized should be the second entity in the multi-part document.

3. An optional capabilities entity that contains the mobile client device capabilities for which the message is formatted. The PI may create this entity to indicate what it assumes the capabilities to be. The PPG also sends a capabilities entity in response to a client capabilities query message.

The above entities may be bundled together as a Multi-Purpose Internet Mail Extensions (MIME) document, which may be sent from the PI to the PPG using a protocol such as HTTP.

PAP is also utilized to support the following example operations in the illustrative embodiment:

1. Push Submission. Delivery of a push message from the PI to a mobile device.

2. Push Cancellation. Allows the PI to attempt to cancel a push submission. All push cancellation requests may be delivered as XML documents.

3. Status Query. The PI can request the current status of a push submission. All status query requests may be delivered as XML documents.

4. Client Capabilities Query. The PI can query the PPG to retrieve the capabilities for a specific mobile client device. All such requests may be delivered as XML documents.

5. Result Notification. The PPG informs the PI of the final outcome of the push submission, for example, confirmation of content delivery to the target mobile client device. Preferably, the result notification operation is optional and occurs only if the PI requests it. All such requests may be delivered to the PI as XML documents when the final outcome of the corresponding push submission is known.

The following are examples of various types of content that may be delivered in the illustrative embodiment using PAP:

1. Service Indication (SI). This content type comprises one or more asynchronous notifications. For example, a given SI may contain a brief message and a URI specifying a particular service. The mobile client can start the associated service immediately or store the SI for later action.

2. Service Loading (SL). This content type allows a user associated with a given mobile client device to load and execute a service specified by a URI.

3. Cache Operation. This content type makes it possible to invalidate content objects in a cache associated with the mobile client device. Preferably, the system is configured such that all invalidated content objects must be reloaded from the server on which they originated the next time they are accessed. The cache operation content type may be utilized, for example, if an application cannot predict when content that it creates will expire.

A typical execution of the PI may include the following steps:

1. Address the PPG and mobile client device.
2. Assemble push content.
3. Assemble push request.
4. Submit push request.
5. Check submission status.
6. Get result notification.

It is to be appreciated that the foregoing push request entities, PAP-based operations and content types, and PI execution steps are merely illustrative examples, and need not be present in a given embodiment of the invention.

As indicated previously, additional details regarding conventional aspects of WAP are well known to those skilled in the art. Such details are therefore not described herein.

Example user registration and secure information access processes in the system 100 are described in the above-cited U.S. patent application Ser. No. 10/668,577. These example user registration and secure information access processes of the illustrative embodiment utilize the example elements of system 100 as shown in FIG. 1. As indicated previously, the invention can be implemented without using these particular elements, and those skilled in the art will recognize that other user registration and secure information access processes can be implemented using other system elements and associated protocols within the scope of the invention.

Figure 2:
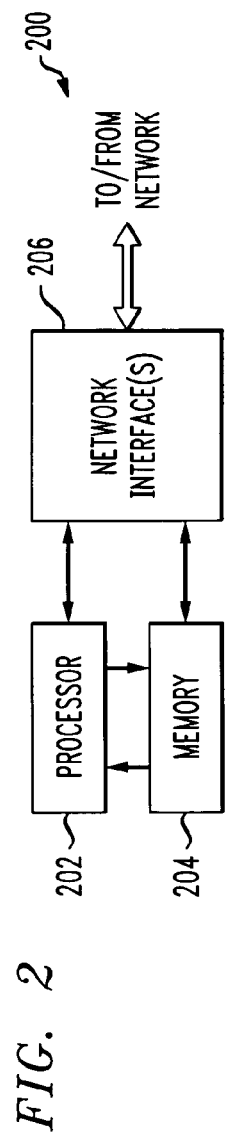
FIG. 2 is a simplified block diagram showing one possible implementation of a processing element of the FIG. 1 system.

FIG. 2 shows one possible implementation of a given processing element of the FIG. 1 system. The processing element 200 of FIG. 2 may represent, by way of example, at least a portion of the mobile client device 110, the EMCS 104, the WSS 106, or other processing element of the system 100.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. For example, if viewed as representative of a mobile client device, the processing element 200 may include conventional elements typically associated with such a device, such as codecs and other voice signal processing hardware or software elements.

The voice message notification and retrieval functionality of the system 100 will now be described in greater detail.

The system 100 in the illustrative embodiment is configured so as to automatically generate and send notifications to the mobile client device 110 upon the arrival of new voice messages in the corresponding account in VMS 120. The notification may advantageously include a live telephone link to the VMS 120, such that the user, upon receipt of the notification, need only press a single key on the client device in order to activate the live telephone link to connect to the VMS and retrieve the voice message(s).

In other embodiments, additional information may be sent in the push content with the live telephone link, such as user account information. This can provide a further reduction in the amount of information that the user must enter at the mobile client device. For security reasons, it is generally preferable not to send VMS account passwords in the push content in the illustrative embodiment, but such account information could be sent if protected through cryptographic operations or other suitable mechanisms.

The above-described single-key operation in the illustrative embodiment avoids the need for any user recall or entry of VMS telephone numbers at the client device. Moreover, the approach leverages the existing VMS, PBX and other telephony equipment of system 100 in order to provide the improved voice message notification and retrieval functionality at very low cost.

In the FIG. 1 embodiment, a given user of the VMS 120 registers for the voice message notification and retrieval service by providing a user profile that includes identifying information for his or her VMS account as well as for the mobile client device which is to receive the corresponding voice message notifications.

The user may be permitted to register multiple voice mailboxes from the same VMS or from a number of different VMSs. Since live telephone links for the various mailboxes are pushed to the client device, the system provides a unified and efficient mechanism for retrieving voice messages from different mailboxes. The user can set up and change various parameters such as notification intervals in conjunction with or subsequent to an initial registration.

In operation, when a new message is left on the VMS 120 for a given user, the VMS makes an outgoing call to the PBX 122. The outgoing call includes destination information for the user. This destination information in the illustrative embodiment may include a prefix and a suffix, with the prefix providing routing information to the PBX, and the suffix containing user identification information. The outgoing call from the VMS is routed by the system over an H.323 trunk from the VMS to the EMCS 104. The EMCS extracts the user identification information from the received H.323 call. The EMCS then prepares and posts the messaging service content to the WSS 106 via HTTP.

The WSS converts the content into a format suitable for the mobile client device of the particular user, with an embedded live telephone link, and initiates a WAP push operation. A text notification with an embedded URI is then pushed to the mobile client device of the user. The text notification may include information such as which of a number of user-assigned mailboxes the message is from, the identity of the caller, the length, subject matter and urgency of the message, and so on.

The user fetches the corresponding service content by pressing a single key, such as an OK button, or entering another type of command which activates the live telephone link. The live telephone link when activated connects the mobile client device to the VMS such that the user can retrieves therefrom the newly arrived voice message. The connection between the mobile client device and the VMS may be via a conventional cellular or wireless telephone call of a type normally placed by a user at the mobile client device.

In the foregoing example, the text notification and live telephone link to the VMS are sent together, such that upon receipt of the notification, entry of a single command at the mobile client device is sufficient to activate access to the VMS for subsequent retrieval of the associated voice message. However, the text notification and the live telephone link need not be sent together, as is illustrated by the following example.

Another example set of operations associated with an implementation of a voice message notification and retrieval process in the illustrative embodiment of FIG. 1 is as follows.

1. A new voice message is left for a given user on the VMS 120.

2. User identification information is determined in the VMS.

3. The VMS makes an outgoing call to the PBX 122. The outgoing call includes the routing information to the PBX and the user identification information.

4. The call is received at the PBX.

5. The PBX routes the call to an appropriate H.323 trunk.

6. The EMCS 104 receives the H.323 call.

7. The EMCS extracts the user identification information from the H.323 call and searches an associated database to find a match between the user identification information and a registered mobile client device.

8. The EMCS generates the messaging service content, which includes a notification and a live telephone link to the VMS, and posts it to the WSS via HTTP.

9. The WSS generates a corresponding text notification.

10. The WSS initiates a WAP push operation and an SI which includes the text notification is sent from the PI 116 to the PPG 114.

11. The PPG pushes the SI to the mobile client device.

12. The mobile client device displays the text notification and the user presses the OK button to fetch the corresponding voice message.

13. The WG 112 receives a WAP request for the content from the mobile client device and sends to the WSS a corresponding HTTP request to fetch the content.

14. The WSS transcodes the XML content into WML/XHTML with an embedded live telephone link to the VMS.

15. The WSS responds to WG with WML/XHTML content via HTTP.

16. The user presses the OK button again to directly call the VMS. This establishes a connection between the mobile client device and the VMS that allows the user to retrieve the voice message.

The foregoing examples, although illustrated for notification and retrieval of a single voice message from a single VMS, can be readily modified to accommodate retrieval of multiple voice messages, from a single voice mailbox on a given VMS or from multiple voice mailboxes on the same or different VMSs.

Multiple voice message notification may be implemented, by way of example, by configuring the WML/XHTML content generated by EMCS/WSS as a multi-part document, with each part corresponding to one voice mailbox.

It should also be understood that the particular processing operations in the foregoing examples are not requirements of the invention, but are merely indicative of typical operations in the illustrative embodiment of FIG. 1. Other processing operations may be used in alternative embodiments. For example, the notification mechanism for conveying user identification information from the VMS to the EMCS is not limited to H.323 calls, and any alternative technique for conveying such information may be used. An advantage of the H.323 interface, however, is that it provides a simple and reliable system integration utilizing otherwise conventional VMS, PBX and other telephony equipment elements. Examples of alternative notification mechanisms for communicating information between the VMS and the EMCS include session initiation protocol (SIP) notifications, or e-mail notifications.

Also, the notification provided to the mobile client device within the push content is not limited to a text notification, and other types of notification, including audible notifications or other types of user-perceptible notifications indicative of a received voice message, may be used.

Furthermore, push content comprising a notification of at least one received voice message may be generated by the WSS alone, by the EMCS alone, or by the WSS operating in conjunction with the EMCS as in the foregoing examples. The term "server" as used herein may refer to the WSS, to the EMCS, to a single server which comprises the WSS and the EMCS, or to a set of servers which collectively comprise the WSS and the EMCS.

As previously noted, one or more of the processing functions described above in conjunction with the illustrative embodiment of the invention may be implemented in whole or in part in software utilizing processor 202 and memory 204 associated with a processing element of the system. Other suitable arrangements of hardware, firmware or software may be used to implement the techniques of the invention.

The present invention provides numerous advantages over the conventional techniques previously described. For example, as noted above, the invention in the illustrative embodiment supports single-key operation for access from a mobile client device to a VMS to allow retrieval of a stored voice message, thereby avoiding the need for users to enter VMS telephone numbers at their mobile client devices.

Also, the invention can be used to provide automated notification and retrieval for multiple mailboxes across different VMS providers. This can in effect make it appear to the user as if all the messages from the multiple mailboxes of the various VMSs utilized by that user are associated with a single common mailbox, thereby avoiding the need for the user to monitor separately any such multiple VMSs.

Moreover, the voice message notification and retrieval is provided in a secure manner, without compromising the EMCS, VMS or other elements behind the system firewall.

The system in the illustrative embodiment also supports, in addition to voice message notification and retrieval, secure user registration and administration, over-the-air reconfiguration, and secure enterprise multimedia content access.

Advantageously, the system leverages existing VMS, PBX and other telephony equipment elements of the system, such that the voice message notification and retrieval is provided in a particularly efficient manner and at low cost.

Another important advantage of the present invention is that, in an illustrative embodiment in which notification involves multimedia content or a multi-part document, all information regarding the physical location of the content and the procedures for retrieving the content may be encoded in accordance with the WAP push protocol, so as not to be visible from a display screen of the mobile client device. This feature makes the present invention safe to use in a crowded area with other people nearby, and therefore alleviates a problem that arises in conventional techniques, such as those based on SMS, where such information may be shown explicitly on the mobile client device display screen.

The techniques of the present invention can be utilized with any type of VMS, and can also be applied to other types of messaging, including messaging associated with conference call notification and so-called "exceptional" conferencing. It can also be used with messaging associated with e-mail, fax, stock quotes, etc. As another example, it can be used to allow a user to select among different levels of call bridging, such as bridging the calls to the mobile client device or bridging only voice messages.

It should again be emphasized the above-described arrangements are illustrative only. For example, alternative embodiments may utilize different processing element hardware, firmware or software configurations, different push and pull mechanisms, and different communication protocols than those of the illustrative embodiments. These and numerous other alternative embodiments within the scope of the following claims will be apparent to those skilled in the art.

What is claimed is:

1. A method for providing voice message notification and retrieval functionality for a mobile client device in a communication system, the method comprising the step of:
   generating push content deliverable from a first server to the mobile client device over a wireless network, wherein the push content comprises a notification of at least one voice message received for a corresponding user in a voice messaging system;
   wherein a connection between the mobile client device and the voice messaging system is initiatable from the mobile client device, responsive to the push content, for retrieval of the at least one received voice message;
   wherein the first server is located outside of an enterprise firewall and the voice messaging system is located behind the enterprise firewall;
   wherein the voice messaging system upon receipt of the voice message for the corresponding user makes an outgoing call to a call processing element also located behind the enterprise firewall; and
   wherein the outgoing call is routed by the call processing element to a second server, the second server being located behind the enterprise firewall, the second server communicating information associated with the outgoing call to the first server, the first server utilizing said information to deliver the push content to the mobile client device.

2. The method of claim 1 wherein the push content is generated in the first server responsive to information received in the first server from an enterprise application comprising said second server.

3. The method of claim 2 wherein the enterprise application comprises an enterprise multimedia communication server.

4. The method of claim 3 wherein the voice messaging system is coupled between the enterprise multimedia communication server and a private branch exchange element comprising the call processing element.

5. The method of claim 4 wherein the voice messaging system upon receipt of the voice message generates the outgoing call to the private branch exchange element, the outgoing call comprising routing information and user identification information, the user identification information identifying the user corresponding to the received voice message.

6. The method of claim 5 wherein the outgoing call is processed in the private branch exchange element in a manner that results in a connection being established between the voice messaging system and the enterprise multimedia communication server, the user identification information thereby being made accessible to the enterprise multimedia communication server.

7. The method of claim 4 wherein at least a subset of the voice messaging system, the enterprise multimedia communication server and the private branch exchange element comprise elements of a communication system switch.

8. The method of claim 1 wherein the second server comprises an enterprise multimedia communication server.

9. The method of claim 1 wherein the first server comprises a wireless secure server.

10. The method of claim 9 wherein the wireless secure server communicates with the mobile client device utilizing wireless application protocol (WAP).

11. The method of claim 9 wherein the push content is deliverable from the wireless secure server to the mobile client device via a series connection of a push initiator and a push proxy gateway.

12. The method of claim 1 wherein the push content comprises at least one link which when activated at the mobile client device initiates a connection between the mobile client device and the voice messaging system.

13. The method of claim 12 wherein the at least one link comprises a live telephone link specifying at least a telephone number of the voice messaging system.

14. The method of claim 1 wherein the connection between the mobile client device and the voice messaging system is initiatable from the mobile client device utilizing a single-key operation.

15. The method of claim 1 wherein the push content is generated in the form of a service indication (SI) including at least one notification message and at least one corresponding link which when activated provides access to the voice messaging system from the mobile client device.

16. The method of claim 1 wherein the at least one received voice message comprises a plurality of received voice messages, the push content comprising a notification of each of the plurality of received voice messages.

17. The method of claim 16 wherein at least one of the plurality of received voice messages is associated with a first voice mailbox of the voice messaging system and one or more of the remaining received voice messages are associated with one or more other voice mailboxes of the voice messaging system.

18. The method of claim 16 wherein at least one of the plurality of received voice messages is associated with a first voice messaging system and one or more of the remaining received voice messages are associated with a second voice messaging system different than the first voice messaging system.

19. An apparatus for use in providing voice message notification and retrieval ftmctionality for a mobile client device in a communication system, the apparatus comprising:
- a first server having a processor coupled to a memory;
- the first server being operative to generate push content deliverable to the mobile client device over a wireless network, wherein the push content comprises a notification of at least one voice message received for a corresponding user in a voice messaging system;
- wherein a connection between the mobile client device and the voice messaging system is initiatable from the mobile client device, responsive to the push content, for retrieval of the at least one received voice message;
- wherein the first server is located outside of an enterprise firewall and the voice messaging system is located behind the enterprise firewall;
- wherein the voice messaging system upon receipt of the voice message for the corresponding user makes an outgoing call to a call processing element also located behind the enterprise firewall; and
- wherein the outgoing call is routed by the call processing element to a second server, the second server being located behind the enterprise firewall, the second server communicating information associated with the outgoing call to the first server, the first server utilizing said information to deliver the push content to the mobile client device.

20. An article of manufacture comprising a machine-readable storage medium containing software code for use in providing voice message notification and retrieval functionality for a mobile client device in a conmiunication system, wherein the software code when executed implements the step of:
- generating push content deliverable from a first server to the mobile client device over a wireless network, wherein the push content comprises a notification of at least one voice message received for a corresponding user in a voice messaging system;
- wherein a connection between the mobile client device and the voice messaging system is initiatable from the mobile client device, responsive to the push content, for retrieval of the at least one received voice message;
- wherein the first server is located outside of an enterprise firewall and the voice messaging system is located behind the enterprise firewall;
- wherein the voice messaging system upon receipt of the voice message for the corresponding user makes an outgoing call to a call processing element also located behind the enterprise firewall; and
- wherein the outgoing call is routed by the call processing element to a second server, the second server being located behind the enterprise firewall, the second server communicating information associated with the outgoing call to the first server, the first server utilizing said information to deliver the push content to the mobile client device.

* * * * *